United States Patent [19]
Alagy et al.

[11] Patent Number: 4,780,196
[45] Date of Patent: Oct. 25, 1988

[54] HYDROCARBON STEAM CRACKING METHOD

[75] Inventors: Jacques Alagy, Charbonnieres; Christian Busson, Dardilly; Pierre Chaverot, Lyons, all of France

[73] Assignee: Institut Francis du Petrole, Rueil Malmaison, France

[21] Appl. No.: 37,353

[22] PCT Filed: Jun. 20, 1986

[86] PCT No.: PCT/FR86/00215
§ 371 Date: Apr. 10, 1987
§ 102(e) Date: Apr. 10, 1987

[87] PCT Pub. No.: WO87/00546
PCT Pub. Date: Jan. 29, 1987

[30] Foreign Application Priority Data

Jul. 12, 1985 [FR] France .................. 85 10853

[51] Int. Cl.⁴ .................................................. C10G 9/36
[52] U.S. Cl. ................................. 208/130; 208/48 Q; 208/78; 208/106; 208/132; 585/648; 585/650; 422/193; 422/196; 422/197; 422/200; 422/201
[58] Field of Search ............. 208/106, 132, 130, 48 Q, 208/72, 75, 78; 422/173, 196, 197, 200, 201, 189; 585/648, 649, 650

[56] References Cited

U.S. PATENT DOCUMENTS

| | | | |
|---|---|---|---|
| 2,372,186 | 3/1945 | Chaney | 208/106 |
| 2,758,061 | 8/1956 | Geller | 208/106 |
| 3,572,999 | 3/1971 | Sato | 422/202 |
| 3,579,601 | 5/1971 | Kivlen | 208/132 |
| 3,593,968 | 7/1971 | Geddes | 208/48 Q |
| 3,671,198 | 6/1972 | Wallace | 422/197 |
| 3,964,873 | 6/1976 | Aramaki et al. | 122/235 C |
| 4,044,068 | 8/1977 | Kurtz | 208/130 |
| 4,097,544 | 6/1978 | Hengstebeck | 208/48 Q |
| 4,150,716 | 4/1979 | Ozaki et al. | 208/48 Q |
| 4,248,834 | 2/1981 | Tokumitsu | 208/48 Q |
| 4,412,560 | 11/1983 | Broodman | 208/130 |
| 4,421,702 | 12/1983 | Oda et al. | 264/62 |
| 4,457,364 | 7/1984 | DiNicolantonio | 165/134 R |
| 4,599,480 | 7/1986 | Buddell et al. | 208/132 |
| 4,632,587 | 12/1986 | Vollhardt | 422/201 |
| 4,683,121 | 7/1987 | Goudriaan et al. | 422/196 |

FOREIGN PATENT DOCUMENTS

| | | | |
|---|---|---|---|
| 0074435 | 3/1983 | European Pat. Off. | 208/130 |
| 0121445 | 10/1984 | European Pat. Off. | 165/134 R |
| 2436958 | 4/1980 | France | 264/67 |

OTHER PUBLICATIONS

Chemical Abstract, 84-129527/21, Mar. 21, 1984.
Chemical Abstract, 84-104040/17, Mar. 15, 1984.
Fouling of Transferline Exchanger in Ethylene Plants, AICHE Meeting, Houston, Tex., Mar. 30, 1983.
New Radiant Coil Technology, Wall et al., Chemical Engineering Progress, pp. 50–55, Dec. 1983.
Ethylene: Keystone to the Petrochemical Industry, Kniel et al., pp. 137–142, 1980.

Primary Examiner—Anthony McFarlane
Attorney, Agent, or Firm—Millen & White

[57] ABSTRACT

The invention relates to an improved hydrocarbon steam-cracking method intended to produce more particularly ethylene and propylene.

The method is based on the utilization of a multi-channel system made of ceramic material, in which the charge and heat exchange fluids or refrigerants alternatively pass through the channels or rows of channels constituting the continuous assembly comprising a pyrolysis zone followed by a quenching zone.

The method according to the invention is applicable to charges ranging from ethane to vacuum gas oils.

18 Claims, 2 Drawing Sheets

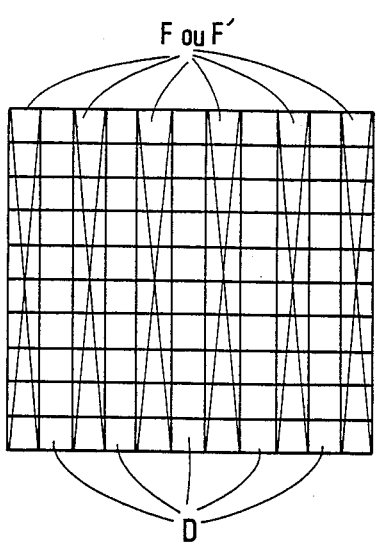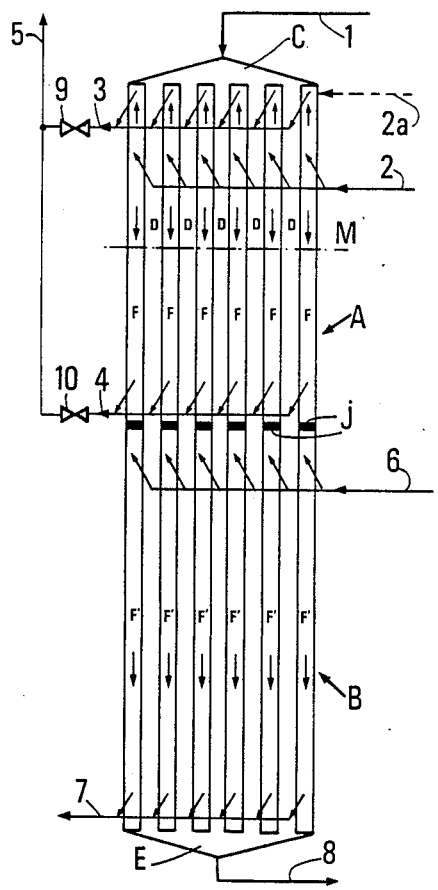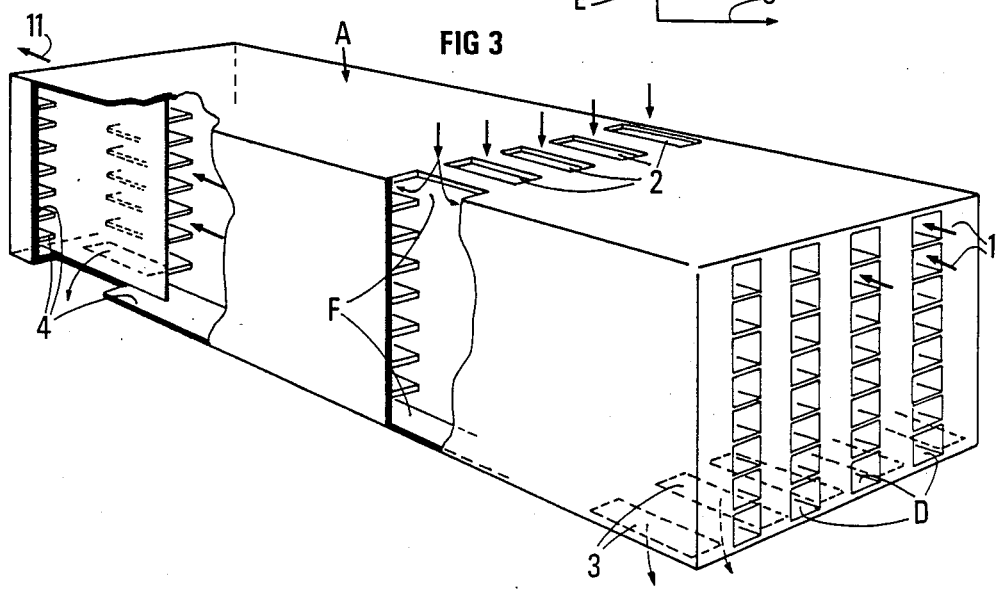

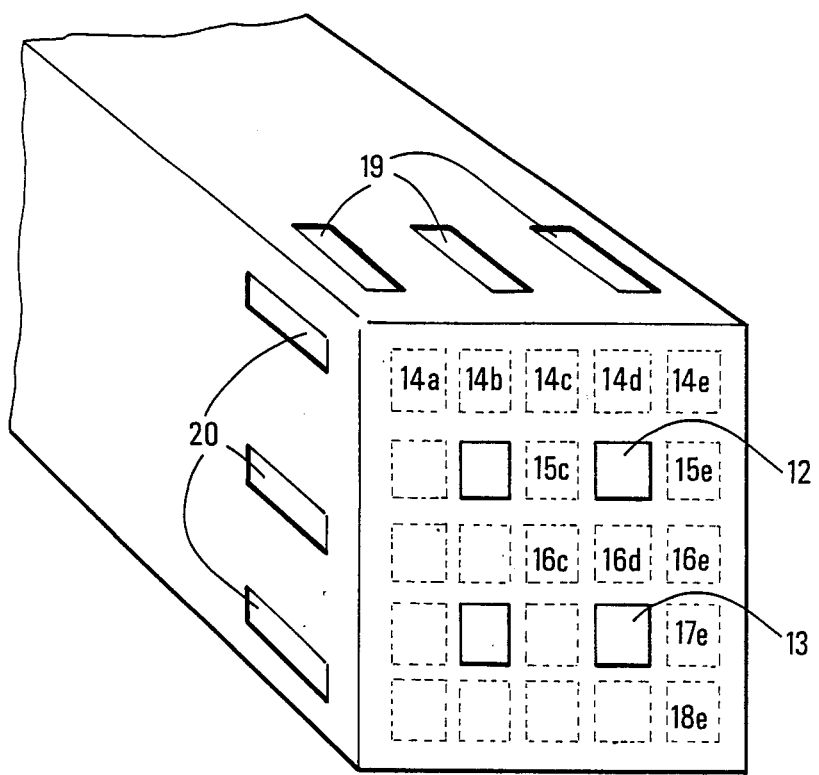

HYDROCARBON STEAM CRACKING METHOD

BACKGROUND OF THE INVENTION

The invention relates to an improved hydrocarbon steam cracking method intended to produce light olefin, and more particularly ethylene and propylene.

Steam-cracking made its appearance as early as in 1920 to produce ethylene from ethane, and rapidly became a basic method in petrochemistry, using increasingly heavier charges, ranging up to the processing of vacuum gas oils.

Its principle is based on the instability at high temperature of paraffins and naphthenes compared to that of olefin and aromatics. The principal reactions are the scission of a C-C bond by a homolytic rupture mechanism leading to an olefine and a paraffin, and dehydrogenation. These two reactions are endothermic and therefore promoted by a rise in temperature; they also cause an increase in the number of molecules, which means that they are promoted by low partial pressures of the hydrocarbons to be processed. It is for that reason that this pressure is reduced as much as possible by addition of steam to the reaction medium.

However, it was rapidly noticed that maintaining a hydrocarbon charge at a temperature of 800° C. for a time of the order of a few tenths of seconds led to the rapid formation of coke deposits, which is detrimental under several headings: reduction of heat transfer between the reactor and the charge to be cracked, great rise in the temperature of the reactor skin, with reduction of the useful diameter of the reactor causing an increase in the pressure drop inside the reactor, which leads to the shutdown of the unit for a decoking operation.

The formation of coke is due to secondary reactions such as the formation of condensed polycyclic aromatic hydrocarbons, as well as the polymerization of the olefin formed.

This latter reaction stems from the tendency that olefin have to be polymerized when the temperature is of the order of 500°-600° C.; for that reason, in order to reduce the extent of this secondary reaction, the reaction effluents are cooled rapidly (this is often called "quenching") in order to bring them rapidly from the temperature at which pyrolysis takes place to a temperature of below 500° C., generally by means of an indirect heat exchanger.

It was also noticed that the polymerization of the olefin was promoted by the presence of nickel at the surface of the metal walls of the heat exchanger, which acts as a heterogeneous polymerization catalyst (M. DENTE et al., "Fouling of transferline exchanger in ethylene plants", AICHE Meeting at Houston, Tex., 30 Mar. 1983).

Thermodynamic and kinetic studies of hydrocarbon pyrolysis reactions therefore led, in order to increase the selectivity of the reaction towards the production of olefin to act on the following parameters:

rapid increase of the temperature of the charge to the optimum pyrolysis temperature for a given charge, and maintenance of this temperature as constant as possible in the reaction zone.

reduction of the residence time of the charge in the reaction part.

reduction of the partial pressure of the hydrocarbon charge.

rapid and efficient quenching of the reaction effluents.

From the technology point of view, these imperatives rapidly led to a general method scheme consisting of:

(a) pre-heating the charge, diluted with steam, (b) heating at high temperature of this mixture in pipe-stills in order to limit the residence time of the hydrocarbons during this pyrolysis phase, (c) rapid quenching of the reaction effluents.

Technological development has concentrated essentially on the pyrolysis (b) and quenching phase (c) to attempt to meet the imperatives stated above and the diversity of the charges to be processed, which at present range from ethane to vacuum gas oils.

The developement of the steam-cracking pipe-stills was essentially directed towards obtaining shorter residence times and a reduction in the pressure drop which led manufacturers to reduce the length of pipe-stills, and therefore increase the heat flow density.

The increase of this latter factor can be obtained essentially by increasing the skin temperature of the pipe-stills and/or reducing the diameter of the pipes (which enables the s/v ratio to be increased, s being the exchange surface and v the reaction volume).

The progress made in metallurgy in special alloys resisting increasingly high temperatures (INCOLOY 800H, HK40, HP40 for example) have enabled manufacturers of pyrolysis pipe-stills for steam-cracking to increase the operating temperatures of these pipe-stills, the metallurgical limits at present being about 1,100° C.

In addition, technology was developed towards using smaller diameter pipes, placed in parallel in order to maintain a satisfactory capacity and remain within a suitable pressure drop.

Several models of pyrolysis pipe-stills have also been suggested, all aiming to increase the heat flow density towards the beginning of the pyrolysis pipe and reducing it subsequently, either by using pipe-stills of increasing diameter, or assembling at least two pyrolysis pipes into one after certain lengths of the reaction zone (see for example F. Wall et al. Chemical Engineering Progress, December 1983, p. 50–55); noncylindrical pipe-stills have also been described, aiming at increasing the s/v ratio; thus U.S. Pat. No. 3,572,999 uses pipes of oval section and U.S. Pat. No. 3,964,873 claims pyrolysis pipes whose section is of dumb-bell shape.

It is in this way that steam-cracker reactor technology developed, from the utilization of horizontal pipes about 100 m long and internal diameter of about 90 to 140 mm, to the "classic" technology of vertically suspended pipes about 40 m long and diameters of the order of 60 mm operating with residence times of the order of 0.3 to 0.4 s, and finally the so-called "millisecond" technique suggested by PULLMAN-KELLOG (U.S. Pat. No. 3,671,198) which uses vertical and straight pipes about 10 m long, internal diameter 25 to 35 mm, these pipes being raised to temperatures of the order of 1,100° C. (metal utilization limit temperature). The residence time of these charges in this type of still is of the order of 0.07 s; the pressure drop observed is of the order of 0.9 to 1.8 bar and the calculation of the ratio of the exchange surface s to the reaction volume v gives values of the order of 120 m.:

As regards the quenching of the reaction effluent products, technology directs itself towards heat exchangers placed in the pyrolysis reaction effluents transfer lines. Numerous exchangers of this type (often called "TLX", "transfer-line-exchanger") have been described in the prior art, as for example in the U.S. Pat. No. 4,097,544 or in the book of L. Kniel, O. Winter and K. Stork "Ethylene keystone to the petrochemical industry", M. Dekker, New York 1980, p. 137 to 142.

The aim of these exchangers is to obtain a sudden drop of the temperature of the effluent gases of the pyrolysis reactors as rapidly as possible to temperatures at which a secondary reaction of olefin polymerization does not take place.

However, the temperature to which the effluent is lowered at the outlet of the quenching exchanger varies in accordance with the steam-cracked charge. For example, when vacuum gas oils of aromatic character are processed, then among the effluents from steam-cracking is quite a large quantity of condensed polyaromatic fuel oils which cannot be cooled suddenly to a low temperature without producing excessing fouling of the exchanger, likely to limit the operating life of the still. In this particular case, it is generally preferred to carry out the cooling operation in two stages, the first being carried out by indirect quenching in the quenching exchanger to a temperature of the order of 450°–500° C., the second stage consisting of direct cooling by the introduction of cold liquids into the exchanger effluents.

Type "TLX" exchanger manufacturers attempted to reduce the dead volume that exists between the outlets of the pipe-stills and the inlets of the effluents in the quenching exchanger, which generally consists of two or three concentric pipes in order to increase the exchange surface areas. Thus U.S. Pat. No. 4,457,364 describes a TLX type exchanger which includes an effluent gases distributor connector in which a reactor pipe corresponds to two exchanger pipes; however, this connector does not entirely overcome the problems of dead volume between the reactor and the quenching exchanger.

However, none of the technologies described for steam-cracking hydrocarbons was fully satisfactory, in particular, none allowed the reactor temperature to exceed about 1,100° C. and therefore raise the temperatures of the charges excessively rapidly to temperatures at which heat cracking takes place under good conditions. In addition, the maximum heat contribution must be made in the endothermic zone where the endothermic cracking of the C-C bonds and dehydrogenation take place, which is not achieved satisfactorily in the existing methods.

In addition, the necessity of maintaining a high heat flow led to the reduction of the section of the pyrolysis pipes, which imposes a reduction of their length if it is desired to retain an acceptable pressure drop. In addition, no present methods allow an approximately constant temperature to be obtained all along the reaction zone; moreover, the heterogeneity of the heat flows causes large temperature deviations at the circumference of each pipe.

Finally, systems of TLX type heat exchangers have two major disadvantages: they have a non-negligible dead volume, which is detrimental to rapid quenching, and they are made of refractory steels, containing nickel, which as already stated, is an olefin polymerization catalyst.

SUMMARY OF THE INVENTION

The object of this invention is to provide a method overcoming these various disadvantages and make it possible to steam-crack a hydrocarbon—or a mixture of hydrocarbons—comprising at least two carbon atoms, leading to improved ethylene and propylene yields compared with those of the existing methods.

The method according to the invention is characterized in that a mixture of said hydrocarbon and steam is circulated in a continuous zone consisting of a plurality of channels of ceramic material forming two groups, each channel of the first group being in indirect heat exhange relationship with at least one channel of the second group, the channels of the first group extending over the entire length of said continuous zone and through which said mixture passes, the channels of the second group being divided into two successive non-communicating sections by an intermediate partition and being fed by a heating fluid in their first section (mixture feed side) and by a cooling fluid in their second section (mixture outlet side), said first and second section constituting respectively a pyrolysis zone and a quenching zone, the feed and draw-off of the heating fluid takes place perpendicularly to the axis of the channels of the first section, said feed taking place at an intermediate point of the first section at a distance from the beginning of said first section (mixture feed side) representing 5 to 50 percent of the total length of the first section, and said draw-off taking place partly upstream and partly downstream of said intermediate point.

In the above arrangement, the channels are preferably straight and parallel to one another, and to each pyrolysis zone channel corresponds a quenching zone channel.

In a first embodiment of the invention, each channel of a group is surrounded by channels of the other group over all its faces.

In a preferred mode of embodiment, the channels of each group are arranged in rows, the channels being of any cross-section but advantageously polygonal and preferentially square or rectangular, the arrangement being designed in a manner such that the charge to be processed passes through rows of channels of order ... $n-2, n, n+2, n+4$ ... and the heat exchange fluids in the first part of their length and the cooling liquids in a subsequent part of their length, pass through the other rows of channels of order ... $n-1, n+1, n+3, \ldots n$ being any integer.

The fluid chosen for the first and last row is not important, the essential point being to ensure row alternance.

The rows of channels through which the charge passes are continuous over the total length of the system. The other rows of channels are divided into two successive parts by a partition at an intermediate point of their length so as to define two zones, the heat exchange fluid passing through the channels of the first zone (in the flow direction of the charge to be processed), thereby determining a pyrolysis zone or a reaction zone, a refrigerating fluid passing through the channels of the second zone, thereby determining a cooling zone, or a quenching zone.

The system obtained in this way therefore constitutes a continuous pyrolysis reactor and quenching exchanger assembly.

In the preferred embodiment of the invention, the arrival of the heat exchange fluid in the rows of channels designed to carry it, takes place substantially perpendicularly to the axis of these rows of channels, by means of one or several openings made in the external wall of the channels concerned located on the periphery, and the channels of a same row are brought into communication at the inlet of the heat exchange fluid by openings made in their lateral walls, so that the heat exchange fluid passes through all the channels intended for that purpose.

Preferably the heat exchange fluid arrives in the pyrolysis zone at an intermediate point of this zone, located at a distance from the beginning of this zone (the beginning being determined by the point at which the charge is introduced) representing 5 to 50% of the total length of this zone and more preferentially 20 to 40% of the total length of this zone; in this way, the maximum supply of heat can be transmitted to the channels through which the charge passes at the place where the endothermic cracking reactions and dehydrogenation take place. In this case the heat exchange fluid is drawn off both at the head and tail of the pyrolysis zone. It is advantageous that 5 to 40% (preferably 20 to 35%) of the heating fluid should be drawn off at the head and the rest drawn off at the tail.

The total number of rows of channels is not determinant in the method; it is obviously a function of the size of the pyrolysis-quenching exchanger reactor and the dimensions of a unit channel. However, within the scope of the invention the heat exchange fluids or refrigerants preferably pass through the external rows of channels.

The number of unit channels per row is also non determinant and is a function of the overall size of the assembly and the size of a unit channel.

A unit channel advantageously has a cross-sectional area of between 9 and 900 mm² and preferably between 25 and 100 mm²; the length of a unit channel can be variable according to the charges to be processed, the processed temperature, the desired contact time and the temperature at which quenching takes place. The total length of a unit channel—including the pyrolysis zone and the quenching zone—is generally between 2 and 15 m and, preferably, between 5 and 10 m.

In a particular mode of embodiment of the method, each unit channel can be subdivided into a plurality of smaller elementary channels.

Within the scope of the invention, a continuous pyrolysis reactor-quenching exchanger can be produced either in the form of a single unit, or else by a contiguous juxtaposition of unit elements of identical form, which are assembled to one another by any suitable means, as for example with the aid of flanges. The utilization of ceramics, and more particularly, silicon carbide, an easily extrudable material, makes utilization of such assemblies or assembly elements easy.

The charges to be processed have a residence time in the reaction zone of between 5 and 200 milliseconds, and more advantageously between 30 and 50 milliseconds; the temperature of the walls in the reaction zone can be raised to a maximum value of the order of 1,500° C. Any refractory ceramic resisting temperatures greater than 1,150° C. can be used within the scope of the invention; silicon carbide, which has a good thermal conductivity and which is easily processed by extrusion is the preferentially used ceramic. Other ceramics are for example mullite, alumina and cordierite.

Numerous indirect heat exchangers made of ceramic have been described in the prior art; their field of utilization is essentially turbine engines, where the heat exchanger material must resist temperatures of the order of 1,200° to 1,400° C. Mention can be made for example, of French Patent No. 2 436 956, U.S. Pat. No. 4,421,702, Japanese patent applications 59 046 496 and 59 050 082, as well as French Patent Nos. 2 414 988 and 2 436 958 (addition of the former), this latter patent describing a method for the fabrication of an indirect heat exchange element of ceramic material which can advantageously be used within the scope of the invention, subject to modifications.

The advantages presented by the invention over known steam cracking methods are numerous:
  a practically homogeneous wall temperature is obtained in the pyrolysis zone.
  it is possible to operate at wall temperatures attaining 1,200° to 1,500° C. exceeding the limits of present metallurgy and enabling the heat flow density and reaction temperature to be increased; this is particularly important in the case of ethane cracking.
  increase in the s/v ratio, s being the exchange surface and v the reaction volume; it is thus that in the so-called "millisecond" technique, this ratio is of the order of 120 $m^{-1}$, whereas the technique of the invention makes it possible to attain values at least equal to 200 $m^{-1}$ and able to attain values of 1000 $m^{-1}$.
  small pressure drop inside the reaction zone, not exceeding 0.5 bars.
  maximum supply of heat to the reaction zone where the highly endothermic reactions take place, giving a very shallow temperature gradient over the whole of the reaction zone.
  inertness of refractory material to the charge and to the pyrolysis products. It has been observed that in the reaction zone the refractory steels containing nickel, when used,
  promote the formation of coke. French Patent No. 2 472 035 proposes, to mitigate this drawback, the utilization of hydrocarbon pyrolysis reactors consisting of a refractory steel lined internally with a layer of various inert compounds, among which silicon carbide is cited; but this process is very difficult to use, does not make it possible to increase the wall temperatures of the reactor, and, in addition, the metal-ceramic interface withstands great temperature variations badly. In this present invention, the inertness of the refractory material used in the pyrolysis zone enables coking to be reduced without any drawbacks; it is therefore not necessary to passivate the surface of the reactor, at the beginning and/or during the utilization programme, as is usual when metal reactors are used.

In the quenching zone, mention has already been made of the detrimental influence of nickel, which promotes polymerization of the olefin formed; there again, the use of a refractory material in the quenching zone enables the formation of polyolefins to be reduced substantially; this results in lesser fouling in the channels through which the fluids pass; the pressure drop is reduced, the yield of olefin is increased and the durations of the operating cycles between two decoking operations are increased.

Silicon carbide which is the preferentially used material in the invention, has good mechanical strength, even when raised to a high temperature, which makes it possible to use the reactor-quenching exchanger assembly by using very thin material - of the order of 1 mm for the walls separating the unit channels, this feature promoting all the heat exchanges.
  The very good thermal stability of the material used provides important advantages when the plant has to be decoked; thus the decoking can be effected with steam at a very high temperature by continuing to pass a heat exchange fluid through the channels provided for that purpose, or else oxidation can be performed, for example with air, in the presence or not of steam, up to wall temperatures that can attain 1,300° to 1,400° C.

Finally, the material used has a very good erosion resistance, which is an important advantage, especially during decoking periods.

The hydrocarbon charges usable within the scope of the invention include simple saturated aliphatic hydrocarbons, such as ethane, mixtures of alkanes, or petroleum cuts such as naphthas, atmospheric gas oils and vacuum gas oils;

these latter can have a final distillation point of the order of 570° C. The petroleum cuts can, if necessary, be subjected to pre-processing such as, for example, a hydrotreating step.

The weight ratio of the dilution steam to the hydrocarbon charge varies according to the charges to be processed. It can be between 0.2 and 1.5; generally, the ratio used is of the order of 0.5 for steam cracking naphtha and of the order of 1 when vacuum gas oil is used.

The heat exchange fluids usable in the pyrolysis zone can be any thermal fluids that are stable at temperatures of the order of 1,200 to 1,500° C.; preference is given to using combustion fumes from burners, or hot recovery gases from other processes.

The fluids usable to cool the effluents in the quenching zone may be, for example, air, alone or mixed with combustion fumes, or else a low temperature and a low pressure steam.

BRIEF DESCRIPTION OF THE DRAWINGS

The invention will be better understood by the description of some modes of embodiment, given by way of illustration, but in no way limitative, which will be made hereinafter with the aid of the attached figures:

FIG. 1 represents a mode of embodiment of the method of the invention, along a longitudinal section of the reactor-quenching exchanger assembly, FIG. 2 represents a section of an element of the rectangular section assembly, comprising square unit channels, FIG. 3 represents an exploded perspective view of a model representative of the pyrolysis zone, of rectangular section, FIG. 4 represents a perspective view of another type of model.

DETAILED DESCRIPTION OF THE DRAWINGS

FIG. 1 shows a multi-channel assembly comprising a pyrolysis zone (A) and a quenching zone (B). The mixture consisting of the hydrocarbon charge to be processed and steam, is preheated, preferably by convection, in a conventional pre-heating zone not shown in the figure. At the outlet of this pre-heating zone, the mixture enters line (1) in the pyrolysis zone (A) where it is distributed by means of the distributor (C) in the plurality of reaction channels (D).

The dotted line (M) represents half of the length of the pyrolysis zone (A); the heat exchange fluid input line (2) in zone (A) is located between (M) and (C) at a distance from the beginning of the pyrolysis zone (A) representing 5 to 50% of the total length of this zone; this heat exchange fluid consists preferably of combustion fumes coming for example from a burner not shown in the figure.

These fumes enter zone (A) and are distributed into the plurality of heating channels indicated by (F); they pass through these series of channels (F) counter-current to the reaction mixture circulating in channels (D) in the part of the zone (A) located between the fumes inlet (2) and their upper outlet (3), and circulate co-current with the reaction mixture between inlet (2) and the lower fumes outlet (4).

The fumes outlet lines (3) and (4) comprise flow regulating systems (9 and 10), like, for example butterfly valves, for regulating the respective flow rates of the fumes between outlets (3) and (4).

In the more general case described above, the fumes leaving by lines (3) and (4), are regrouped and sent back by line (5) to the pre-heating zone by convection.

Closing channels (F) by tight sealing devices (J) enable the pyrolysis (A) and quenching (B) zones to be delimited. The cooling fluid preferentially enters the quenching zone (B) by line (6) located at the very beginning of the exchanger and circulates in cooling channels (F') parallel to channels (D), co-current with the reaction effluents and leaves the exhanger by line (7). If necessary, the cooling fluid circulation direction can be reverse, which fluid in that case, enters the exchange zone (B) by line (7) and, after having cooled the reaction fluids in counter-current, leaves (B) by line (6).

The reaction effluents cooled in this way are collected in zone (E) and recovered by line (8). According to the nature of the charges processed, these effluents can, if necessary, be quenched a second time by direct addition of cold fluid, according to a known method. The subsequent treatments of the effluents are part of the prior art and are outside the scope of this invention.

FIG. 2 represents a section of a reactor element of rectangular section comprising square unit channels.

In this figure, the reaction channels through which the charge to be processed passes are represented by rows of channels (D) such as are described in FIG. 1. The channels through which the heat exchange fluid passes are represented by hatched rows of channels (F) such as are described in FIG. 1.

FIG. 3 represents an exploded perspective view of a module of the pyrolysis zone part (A) of the pyrolysis zone-quenching zone assembly. In this figure, for the sake of clarity, the charge distributor (C) described in FIG. 1 is not shown. The designations used for the various elements are those of FIG. 1.

In this figure, the path of the charge to be processed is represented by arrows (1); the charge enters the pyrolysis zone (A), is distributed into the plurality of unit channels (D), and traverses longitudinally the pyrolysis zone (A) in these multi-channels (D) and leaves zone (A) by the same multi-channels at (11); these multi-channels (D) continue into the quenching zone not shown in the figure, which is immediately contiguous to zone (A).

The path followed by the heat exchange fluid is represented by arrows located opposite orifices (2); the heat exchange fluid enters (A) by orifices (2) located in the first half of zone (A); it is distributed into the plurality of unit channels (F), one part of this fluid passes through these channels counter-current to the charge circulating in channels (D) and leaves (A) by orifices (3); the other part of this fluid circulates in channels (F)

co-current with the charge and leaves (A) by orifices (4).

FIG. 4 illustrates the case of channels such as 12 and 13 intended for carrying reagents in contact on their 4 faces with the channels for the heating fluid or the quenching fluid, such as 14a ... 14e, 15c, 15e, 16c, 16d, and 16e. In this case only the channels drawn in full lines are open at their extremity, while the channels drawn in broken lines are closed at their extremity. The heating (or quenching) fluid is introduced laterally, preferably on two sides, for example, by openings such as 19 and 20. Opposite these openings, free communication is established between the channels. Thus opposite opening 19, channels 14e, 15e, 16e, 17e and 18e communicate with one another while opposite opening 20, channels 14a, 14b, 14c, 14d and 14e communicate with one another.

The heating or quenching fluid can be fed only on one face, for example, the upper face, while maintaining internal communication between the channels indicated above. In this case there are no lateral openings such as 20.

The examples that follow are intended to illustrate the invention but can in no way limit its scope.

EXAMPLE 1A

This example concerns the steam cracking of a vacuum gas oil whose density is d 20/4 = 0.9115 and which has an initial boiling point of 271° C. and a final boiling point of 586° C.

This charge is preheated to 550° C. after having been mixed with steam in a steam/charge weight ratio of 1. This charge was cracked in three installations, one called "conventional" (A) consisting of cylindrical steel tubes of 60 mm internal diameter and 50 m length; the second installation used an "improved" method (B) using straight steel cylindrical pipes of 30 mm internal diameter and 10 m length; the third installation (C) conformed to the invention and included a multi-channel pyrolysis zone made of silicon carbide, each channel having a square section of 10 mm side and a length of 3 m. These three installations operate in a manner such as to have an effluent temperature at the end of pyrolysis of 850° C. In installation C, the heating fluid was introduced at 30% of the length of the pyrolysis zone; 25% of this fluid was drawn off at the head and 75% at the tail.

The pyrolysis effluents were cooled in the case of installations (A) and (B) by means of metal quenching exchanger, and the quenching exchanger (C) conformed to the invention, of silicon carbide, of the same structure and dimension as the multi-channel pyrolysis zone joined contiguously to it by means of a flange.

In exchanger C, all the cooling fluid (air) was introduced at the head and drawn off at the tail. In the preceding, the "head" and "tail" represent lateral charge and discharge at points close to the extremities of each structure, but not to the extremities themselves where only the reagents were fed and drawn off.

The following table summarizes the principal operating conditions of the three types of steam crackers, as well as the weight compositions of the principal fractions obtained.

|  | "CONVENTIONAL" METHOD (A) | "IMPROVED" METHOD (B) | METHOD ACCORDING TO THE INVENTION (C) |
| --- | --- | --- | --- |
| Residence time in milliseconds | 220 | 70 | 30 |
| Pressure drop in bar | 7.2 | 1.8 | 0.05 |
| $\frac{s}{v}$ m$^{-1}$ | 67 | 133 | 400 |
| Methane | 7.9 | 8.1 | 8.0 |
| Ethylene | 17.5 | 20.0 | 27.0 |
| Propylene | 10.8 | 10.9 | 10.8 |
| Butadiene | 3.5 | 3.0 | 5.2 |
| Gasoline cut C$_5$+ | 31.3 | 30.1 | 27.8 |
| Fuel oil cut 200° C.+ | 28 | 26.6 | 20.3 |

As seen from these results, these three steam-cracking methods, conducted at similar degrees of severity (methane content close to 8%) gave very different results, essentially as regards the contents of ethylene and a cut of boiling point greater than 200° C. In particular, the method of the invention made it possible to obtain 35% more ethylene than the most efficient method (B).

EXAMPLE 1B

Example 1A was repeated in the case where the pyrolysis zone is not contiguous to the quenching zone: a common channel 10 cm long joins them, this channel having the same external dimensions as each of the two structures that it joins together but having no internal channels.

In this case, all things being equal, the percentage yields were as follows: methane 8.0; ethylene 22.0; propylene 10.8; butadiene 3.4; gasoline cut C$_5$+29.1; fuel cut 200° C.+25.9.

EXAMPLE 1C

Example 1A was repeated in the case where 100% of the heating fluid is introduced at the head and 100% is drawn off at the tail, all other things being equal.

The percentage yields were: methane 8.0; ethylene 24.1; propylene 10.8; butadiene 4.8; gasoline cut C$_5$+28.2; fuel oil cut 200° C. +23.1.

It is seen that the ethylene yields of examples 1A and 1C were appreciably poorer than that of example 1(A).

EXAMPLE 2

A naphtha charge of density d 20/4=0.722 and whose boiling range was between 40° and 173° C. was steam-cracked in a "conventional" installation (A) and in installation (C) conforming to the method of the invention, such as are described in example 1.

The charge was heated to 600° C. after having mixed it with steam in a steam/charge weight ratio of 0.5. The operation was conducted in a manner such that the CH$_4$ yields were equal to 8% in both cases; the conventional method (A) gave an ethylene yield of 28.2% by weight and method (C) of the invention 39.1% by weight; the propylene yields were respectively 13.2% and 16.3% by weight.

The method according to the invention therefore made it possible to obtain ethylene-propylene with an improved yield of 33% compared with the conventional method.

EXAMPLE 3

The charge used in this example was ethane which was processed in steam-crackers (A) and (C) such as were defined in the preceding examples.

The wall temperature of the pipes of the steam-cracker (A) was raised to 1,100° C. and that of the steam-cracker (C) of the invention to 1,280° C. Under these conditions an ethylene yield of 48.0% by weight was obtained using steam-cracker (A) and 72.5% by weight using the method of the invention.

We claim:

1. A method of steam-cracking a hydrocarbon containing at least two carbon atoms comprising the steps of:
   (a) providing a continuous zone comprising a plurality of channels of ceramic material forming a first group and a second group of said channels, each channel of said first group being contiguous with at least one channel of said second group, the first group channels extending over the entire length of said continuous zone and having inlet means and outlet means respectively at the beginning and end thereof, the second group channels being divided into a first section and a second section, said first and second sections being successive non-communicating sections separated by an intermediate partition, said first section defining a heating zone wherein fluid flowing through said first group channels is heated by indirect heat exchange with a heating fluid flowing through said first section, said second section defining a cooling zone wherein fluid flowing through said first group channels is cooled by indirect heat exchange with a cooling fluid flowing through said second section, said first section having inlet means located at a distance from the beginning of said first section of 5–50% of the total length of said first section, said first section having first outlet means at the beginning thereof and second outlet means at the end thereof, said second section having inlet means at the beginning thereof and outlet means at the end of said second section;
   (b) supplying heating fluid to the first section inlet means, circulating a first portion of said heating fluid through a portion of the first section channels which extends from said first section inlet means to said first outlet means of said first section, circulating a second portion of said heating fluid through a portion of the first section channels which extends from said first section inlet means to said second outlet means of said first section;
   (c) circulating cooling fluid through the second section channels from said inlet means of said second section to said outlet means of said second section; and
   (d) circulating a mixture of said hydrocarbon and steam through the first group channels from said inlet means of said first group to said outlet means of said first group wherein said hydrocarbon is steam-cracked within a portion of the first group channels which is contiguous with said first section of the second group and subsequently quenched in a portion of the first group channels which is contiguous with said second section of said second group, and recovering steam-cracked hydrocarbon at said outlet means of said first group channels.

2. A method according to claim 1, wherein said ceramic material is silicon carbide.

3. A method according to claim 1, wherein said cooling fluid is introduced and discharged perpendicularly to the axis of said second section channels.

4. A method according to claim 1, wherein the inlet means of said first section is located at a distance from the beginning of said first section representing 20 to 40% of the total length of said first section.

5. A method according to claim 1, wherein said cooling fluid circulates in the cooling zone in the same direction as the hydrocarbon and steam mixture exiting the heating zone.

6. A method according to claim 1, wherein the cross-sectional area of each channel is between 9 and 900 mm$^2$.

7. A method according to claim 1, wherein the cross-sectional area of each channel is between 25 and 100 mm$^2$.

8. A method according to claim 1, wherein 5 to 40% of said heating fluid is discharged through said first outlet means of said first section and 60 to 95% of said heating fluid is discharged through said second outlet means of said first section.

9. A method according to claim 1, wherein said continuous zone comprises a plurality of rows of said channels, said plurality of rows comprises alternating rows of channels of said first group and rows of channels of said second group.

10. A method according to claim 1, wherein said channels have a square cross-sectional area.

11. A method according to claim 1, wherein said channels have a polygonal cross-sectional area.

12. A method according to claim 1, wherein said channels have a rectangular cross-sectional area.

13. A method according to claim 8, wherein 20–35% of said heating fluid is discharged through said first outlet means of said first section outlet.

14. A method according to claim 1, wherein the total length of said continuous zone is 2–15m.

15. A method according to claim 14 wherein the total length of said continuous zone is 5–10m.

16. A process according to claim 1, wherein each channel of said first group is contiguous with six channels of said second group.

17. A method according to claim 1, wherein each channel of said first group is positioned contiguous with at least two channels of said second group.

18. A method according to claim 11, wherein said continuous zone comprises at least two distinct sets of unit elements placed contiguously together.

* * * * *